US007328613B2

(12) United States Patent
Völkel et al.

(10) Patent No.: US 7,328,613 B2
(45) Date of Patent: Feb. 12, 2008

(54) PROFILE ELEMENT FOR SOUND REDUCTION ROLLER BLINDS

(75) Inventors: Christian Völkel, Marktleuthen (DE); Stefan Bräuer, Selb (DE); Klaus Griesshammer, Rehau (DE)

(73) Assignee: Rehau AG & Co., Rehau (DE)

( * ) Notice: Subject to any disclaimer, the term of this patent is extended or adjusted under 35 U.S.C. 154(b) by 63 days.

(21) Appl. No.: 10/558,089

(22) PCT Filed: May 19, 2004

(86) PCT No.: PCT/EP2004/005380

§ 371 (c)(1), (2), (4) Date: Nov. 23, 2005

(87) PCT Pub. No.: WO2004/104355

PCT Pub. Date: Dec. 2, 2004

(65) Prior Publication Data

US 2006/0283563 A1 Dec. 21, 2006

(30) Foreign Application Priority Data

May 23, 2003 (DE) ................................ 203 08 240

(51) Int. Cl.
*G01F 15/14* (2006.01)
*E06B 9/00* (2006.01)

(52) U.S. Cl. ...................... 73/432.1; 160/232; 160/235

(58) Field of Classification Search ............... 73/432.1, 73/431; 160/235, 232, 133, 236
See application file for complete search history.

(56) References Cited

U.S. PATENT DOCUMENTS 4,536,929 A * 8/1985 Riexinger sen. et al. .... 29/33 K
4,628,982 A * 12/1986 Labelle ....................... 160/235

FOREIGN PATENT DOCUMENTS

| | | | |
|---|---|---|---|
| DE | 12 82 284 B | | 11/1968 |
| DE | 2505682 | * | 8/1976 |
| DE | 30 32 946 A | | 4/1982 |
| DE | 91 16 233 U | | 6/1992 |
| GB | 609 889 A | | 10/1948 |

* cited by examiner

*Primary Examiner*—Helen Kwok
(74) *Attorney, Agent, or Firm*—Venable LLP; Robert Kinberg; Steven J. Schwarz

(57) ABSTRACT

The invention relates to a profile element which can be flexibly connected to other adjacent profile elements in order to form a roller blind. The profile element includes a front side and a rear side which are arranged at a distance from each other and at least one cavity is arranged therebetween, wherein an opening made therein leads into the front wall thereof and a sound-absorbing material is arranged therein. The aim of the invention is to improve the profile element in the above-mentioned manner, especially with respect to the sound-insulating properties thereof. The inventive profile element can be produced by virtue of the fact that the sound-absorbing material part includes at least one sound reduction element which can be displaced at least in the region of the opening in order to open towards and away from the path thereof.

31 Claims, 3 Drawing Sheets

PROFILE ELEMENT FOR SOUND REDUCTION ROLLER BLINDS

Figure 1:
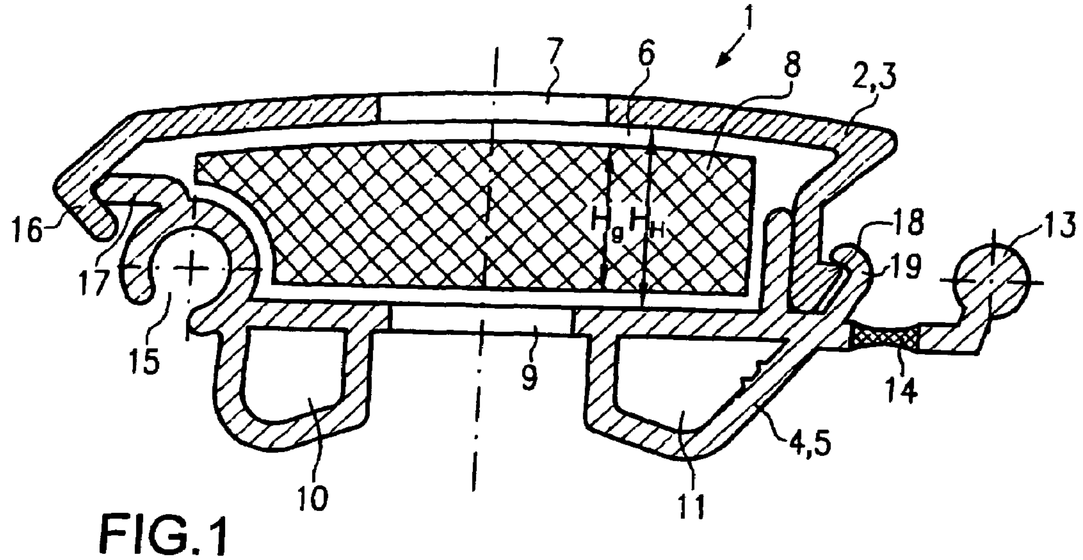

The present invention relates to a profile element which can be flexibly connected to respectively adjacent profile elements in order to form a roller blind. Said profile element comprises a front side and a rear side, arranged at a distance from each other and enclosing at least one cavity arranged in-between into which an opening empties that is provided in the front wall, wherein the cavity comprises a sound-absorbing material.

A profile element of this type is known, for example, from reference DE 30 32 946. This reference describes Venetian blind lamellas and profile elements for roller blinds. The profile elements are hollow profiles filled with a sound-absorbing material, wherein the front side facing the inside space is perforated to allow sound to enter. The profile element and the roller blinds produced therewith are designed to achieve a reduction in sound by allowing the sound to enter the profile element through a plurality of perforations and then penetrate the sound-absorbing material arranged behind, which fills the cavity of the profile element. However, the sound-insulating properties cannot always meet the requirements to be met by such profile elements.

It is therefore the object of the present invention to improve a profile element of the aforementioned type, in particular with respect to the sound-insulating properties.

This object is solved according to the invention with a profile element of the aforementioned type for which the sound-absorbing material forms a portion of at least one sound-reducing element which can be moved either toward the opening or away from it, at least in the region of the opening.

This solution is simple and has the advantage that the sound can enter through the opening, can penetrate the inside of the profile element, and can propagate therein.

Since the sound-reducing element is not designed to completely fill the cavity and can move toward the opening or away from it, at least in the region of the opening, the sound-insulating element can already be at a distance to the front wall when the sound enters or can be moved by the sound pressure to be at a distance. By way of the spacing between the sound-insulating element and the front wall, the sound propagates in such a way that it comes in contact with at least a large portion of the surface of the sound-reducing element and is absorbed in the process. The sound-reducing properties of the roller blind can thus be improved considerably as compared to traditional roller blinds where the cavity is completely filled with the sound-absorbing material.

The profile element according to the invention can be realized cost-effectively if the sound-reducing element substantially takes the form of a mat.

According to one advantageous modification of the invention, the sound-absorbing material can be a fiber material, wherein excellent sound-absorbing properties can be achieved easily and cheaply with such materials.

It can be advantageous if the sound-absorbing material is a nonwoven material. The sound-absorbing properties of nonwoven material are extremely good and the material can be processed easily.

According to an alternative embodiment, the sound-reducing element can be a membrane, preferably made of plastic. With a membrane of this type, sound frequencies can be absorbed as desired, depending on the material.

According to one advantageous modification of the invention, only one opening can be provided in the front wall as seen in the cross section. In particular with the sound-reducing element according to the invention, having only one opening in the cross section, the number of openings in the profile element can also be reduced in longitudinal direction of the profile element and the production can thus be simplified.

It can furthermore prove advantageous if the width of the opening, as seen in the cross section, amounts to less than one third and more than one tenth of the width of the front wall, preferably less than one fourth and more than one eighth. It has turned out that a good sound-insulating effect can be achieved cost-effectively with these predetermined values.

It can furthermore be advantageous to provide several spaced apart openings in longitudinal direction of the profile element, thereby resulting in a further improvement in the sound-reducing effect.

In that case, it can be advantageous if the openings are spaced apart uniformly to optimize the sound-reducing effect.

Designing the spacing between the openings to be smaller or equal to the dimension of the opening in longitudinal direction of the profile element can also be advantageous.

It can also prove advantageous when the dimension of the opening in longitudinal direction of the profile element is shorter or equal to twice the dimension of the opening in the cross section of the profile element.

For one advantageous modification of the invention, an additional opening can be provided in the rear wall. The sound-reducing properties of the roller blind can be improved further with an additional opening of this type, which empties into the cavity or into an additional cavity of the profile element.

In that case, it can be advantageous if the openings in the front wall and the rear wall have substantially the same shape.

According to a different advantageous modification of the invention, at least one intermediate wall can be provided between the front wall and the rear wall, thus making it possible to further improve the sound-reducing properties.

It can prove advantageous in that case if the intermediate wall is arranged such that at least a first cavity is formed between front wall and intermediate wall and at least a second cavity between rear wall and intermediate wall. The sound-reducing properties can be improved even further with such a successive arrangement of the cavities.

The sound-reduction properties can also be improved if the openings in the front wall and the rear wall are aligned.

It can also prove advantageous if at least one opening is provided in the intermediate wall which connects the two cavities and if furthermore the opening in the intermediate wall is aligned with the opening in the front wall or with the opening in the rear wall. In this way, the sound can travel through the complete roller shade to be mostly absorbed during the course of the distance traveled through the sound-reducing element.

It can also prove advantageous if the sound-reducing element extends over the complete length of the profile element, thus making it possible to simplify the production.

According to one advantageous modification of the invention, the hollow profile can be provided with means for fastening the sound-absorbing element, thereby preventing an undesirable displacement of the sound-reducing element.

The fastening means in this case can be provided with recesses for accommodating projections and the sound-reducing element can be provided with a projecting edge that can be secured in the recesses. As a result, a form-locking connection is ensured between profile element and sound-reducing element.

The profile element can be designed to have at least two parts, meaning a first profile section comprising the front wall and a second profile section comprising the rear wall, thus making it easier to assemble the sound-reducing element.

Thus, if the first profile section is removed, the sound-reducing element can be inserted into the second profile section and the first profile section can subsequently be fitted on, so as to enclose the sound-reducing element.

It can furthermore prove advantageous if the intermediate wall is attached to the second profile section.

It can also be advantageous if the fastening means are attached to the second profile section, thereby making it possible to simplify the fastening of the sound-reducing element.

For an easier assembly of the first and second profile sections, the first profile section can be connected to the second profile section by means of a snap-on connection.

In the process, it can be advantageous if the first profile section can be snapped in the manner of a lid onto the second profile section.

It can furthermore be advantageous if the intermediate wall is formed with the aid of a profile insert, arranged between front wall and rear wall.

The secure seating of the profile insert can be ensured if the profile insert is provided with support sections, by means of which it supports itself between the front wall and the rear wall.

According to one advantageous modification of the invention, the membrane can be fixedly connected to the profile insert.

Figure 2:
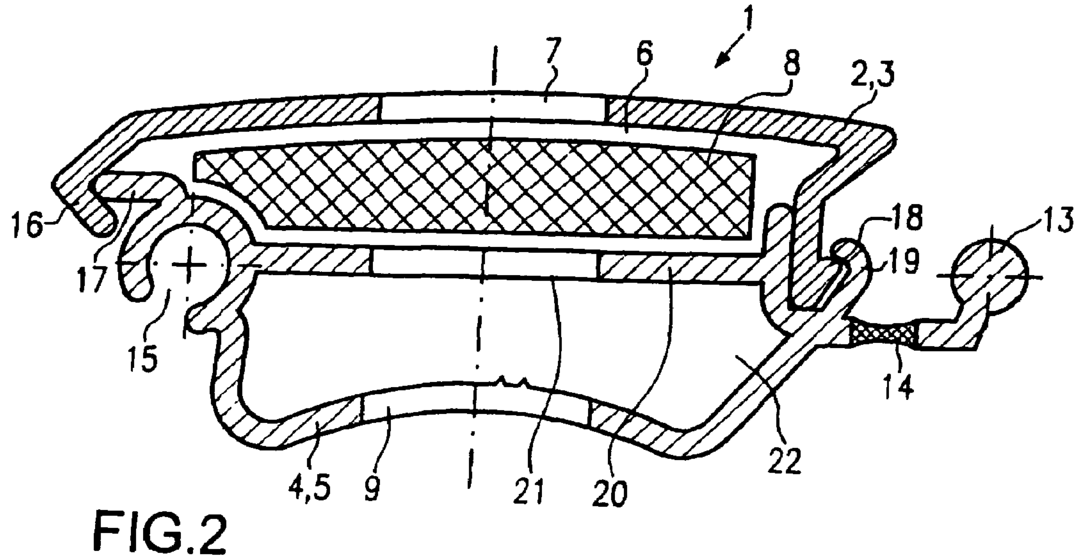
Figure 3:
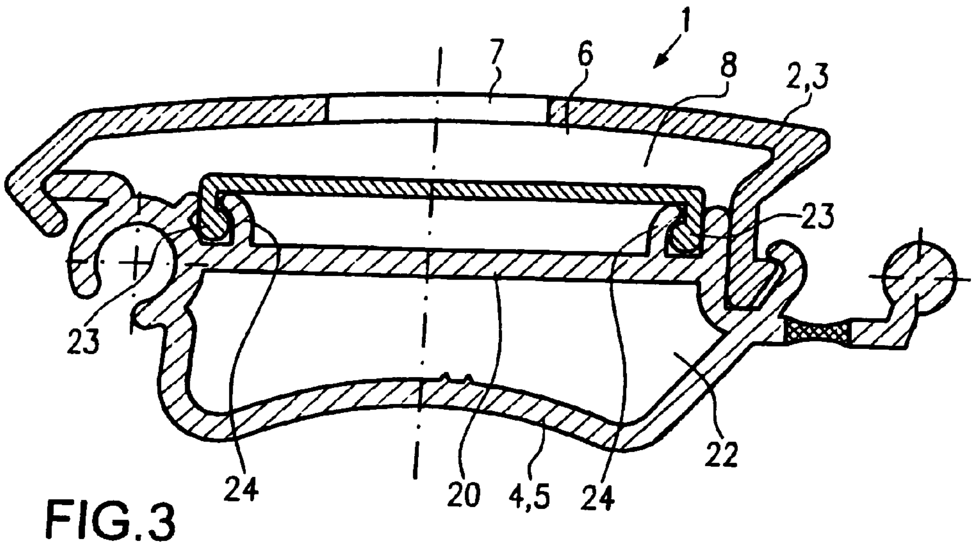
Figure 4:
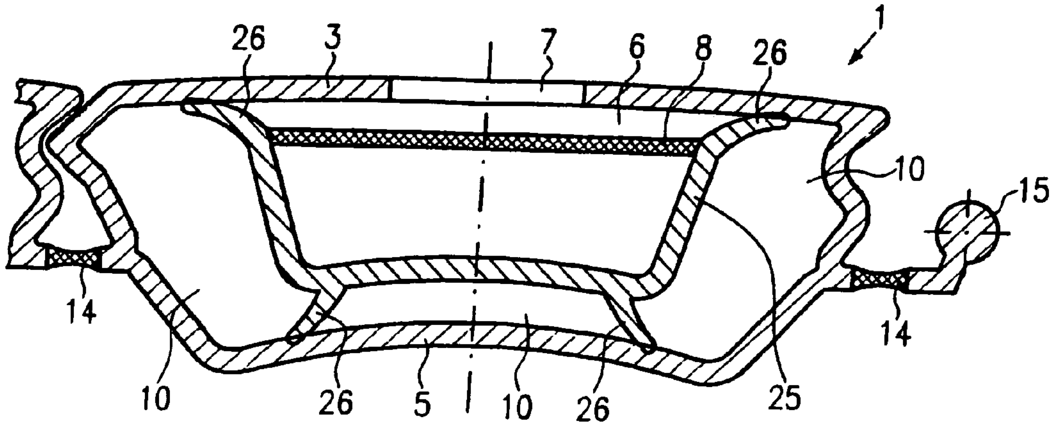
Figure 5:
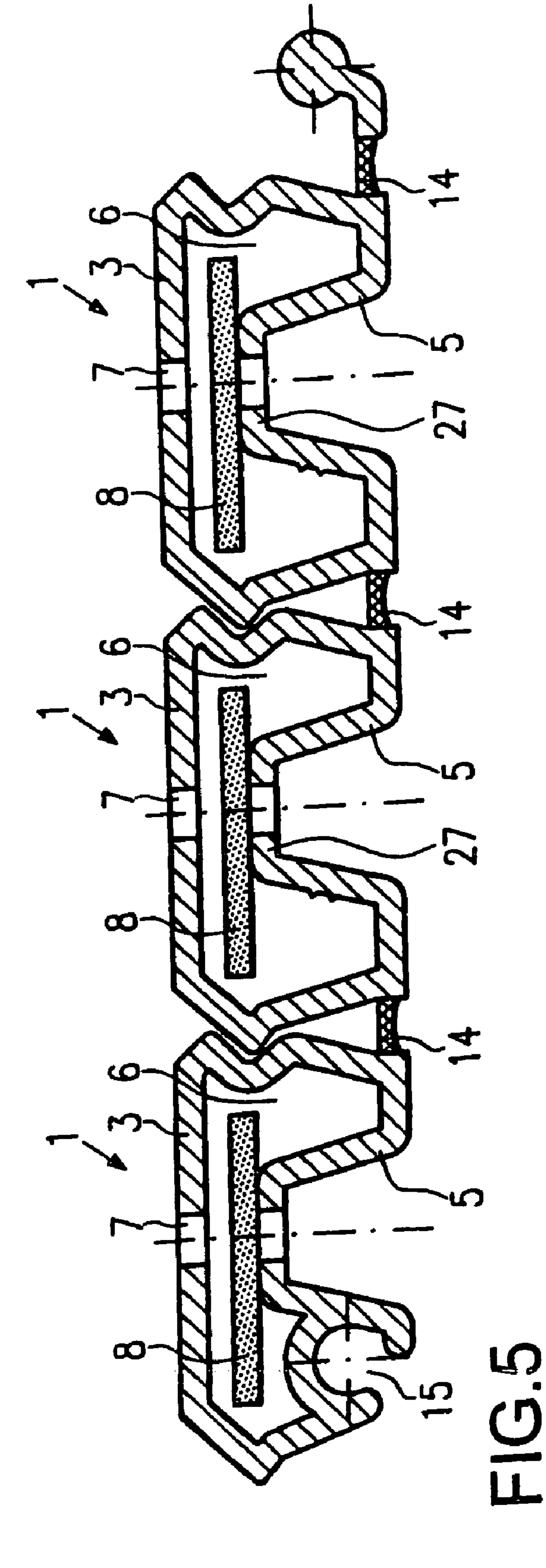
Figure 6:
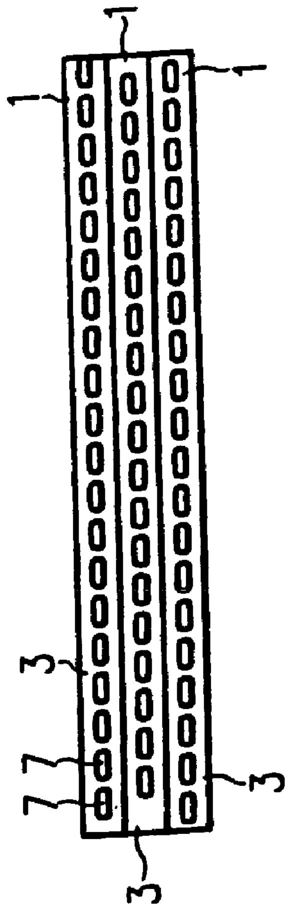

The function and operation of the invention is explained in the following with the aid of several exemplary embodiments, showing in:

FIG. 1 A first embodiment of a profile element according to the invention, in a sectional view;

FIG. 2 A second embodiment of a profile element according to the invention, in a sectional view;

FIG. 3 A third embodiment of a profile element according to the invention, in a sectional view;

FIG. 4 A fourth embodiment of a profile element according to the invention, in a sectional view;

FIG. 5 A fifth embodiment of a profile element according to the invention, in a sectional view;

FIG. 6 A view of the front wall on several of the inventive profile elements, as shown in FIG. 1.

FIG. 1 shows a sectional view of the profile element 1 according to the invention. The profile element 1 is formed with a first profile section 2, comprising a front wall 3, and a second profile section 4, comprising a rear wall 5. The first and second profile sections enclose a cavity 6.

The first and second profile sections can be made of plastic, for example, and can be produced with the extrusion method in a manner known per se. The first and second profile sections can be composed of different materials or the same type of materials, wherein the first and second profile sections can conceivably also be produced from aluminum.

The front wall 3 is provided with an opening 7 which empties into the cavity 6. A sound-reducing element 8 of a fiber material is arranged inside the cavity 6. In the present case, the sound-reducing element 8 is composed of a non-woven material.

The rear wall 5 contains an additional opening 9, which is aligned with the opening 7. Two additional cavities 10 and 11 are formed in the second profile section 4. The cavities 10 and 11 are closed as seen in the cross section.

The second profile section, shown on the right side of the embodiment according to FIG. 1, is furthermore provided with a connecting means 12 with a fastening projection 13, which is flexibly connected via a living hinge 14 to the second profile section. A fastening recess 15 for accommodating the projection can be seen on the left side of the profile section shown in FIG. 1, wherein the inside dimensions of this recess essentially correspond to the outside dimensions of the fastening element 13. As a result, the fastening element 13 of an adjacent profile element can be made to engage in a manner known per se in the fastening recess 15. A roller blind is formed by joining several profile elements in a row.

The first profile section shown in FIG. 1 is embodied on the left side essentially in the shape of a hook, with a hook-shaped part 16 that encloses a holding section 17 on the second profile section 4. On the right side of the first profile section 2, as shown in FIG. 1, the first profile section 2 is provided with a detent 18 which engages in a recess 19 on the second profile section 4. The first profile section 2 is composed of an elastic material and can be attached by first inserting the detent 18 into the recess 19 and subsequently snapping it onto the holding section 17 on the second profile section 4. The dimensions in this case are selected such that the first profile section 2 is snapped with slight pre-tensioning onto the second profile section 4.

The two openings 7 and 9 are essentially circular and have substantially the same dimensions. For this representation, the width and/or the diameter amount to approximately one fourth of the total width of the front wall.

Elongated openings can also be used in place of circular openings, wherein the length in longitudinal direction of the rod, meaning perpendicular to the illustration shown in FIG. 1, amounts to at most twice the width of the opening. In that case, several uniformly spaced-apart openings are provided in longitudinal direction, wherein the distance between adjacent openings is less or the same as the width of an opening for the embodiment shown in FIG. 1. FIG. 6, for example, shows an arrangement of this type for the openings.

The dimensions of the sound-reducing element 8 are selected such that its height $H_g$ for the embodiment shown in FIG. 1 is less than the height $H_H$ of the cavity 6. The height of the sound-reducing element in this case is approximately 15% below the height of the cavity, thus ensuring the mobility of the sound-reducing element 8 in axial direction of the opening, at least in the region of opening 7. Since the roller blind in most cases is rolled up during the insertion, or the front wall is positioned in a vertical plane, it can happen that the sound-reducing element 8 comes to rest against the inside of the front wall 3. However, it can be moved away again from the front wall by the sound pressure.

In viewing direction toward the front wall 3 and into the opening 7, the sound-reducing element completely covers the opening 7.

The width of the sound-reducing element can be slightly less than the inside width of the cavity 6 in a direction transverse to the height, meaning in horizontal direction for the embodiment shown in FIG. 1. The width of the sound-reducing element 8 for the embodiment shown in FIG. 1 is smaller by at least 10% than the inside width of the surrounding regions of the cavity 6 and/or the second profile section, which are adjacent to the sound-reducing element 8.

The mode of operation and the function of the invention will be explained in further detail in the following.

As mentioned in the above, a roller blind is formed by sliding together the fastening elements 13 and the fastening recesses 15 of respectively adjacent profile elements. This roller blind can be guided, in a manner known per se, inside tracks mounted on the side and can be rolled up by means of a roll or a curved track, as known from prior art. In the unwound state, for example when closing off the opening in a piece of furniture in a room, the front wall 3 faces the inside space. The sound coming from the inside space travels via the opening 7 into the cavity 6 where it can be absorbed by the sound-absorbing material of the sound-reducing element 8. As a result of the design of the sound-reducing element 8, an air gap is formed between the front wall and the sound-reducing element 8, by means of which the sound can propagate in the cavity 6, such that the complete surface of the sound-reducing element is used for absorbing the sound.

Owing to the fact that the sound-reducing element can move in the opening region, at least in axial direction of the opening, a good sound-technical uncoupling is achieved between the sound-reducing element 8 and the profile element. Insofar as the sound-reducing element 8 comes in contact with the front wall 3, as a result of the rolling up and unwinding of the roller blind, the sound pressure of the entering sound can push back the sound-reducing element in order to unfold the sound-absorbing effect. As compared to traditional solutions where the cavity is completely filled with sound-absorbing material, the sound can propagate better in the cavity according to our invention, so that the sound-absorbing properties of the sound-reducing element 8 are better utilized. In addition, the number of openings in the front wall can be reduced, and the assembly of the profile element according to the invention is simultaneously made easier. In particular with designs not having two or more parts, but for which the profile element consists of a single part, the sound-reducing element 8 can be inserted, for example, from the side into the profile element. Since it is held only loosely in the cavity, it can be inserted without problem into the profile element.

The sound-reducing properties can be improved further with this second opening 9. Owing to the design of the sound-reducing element 8, the sound-reducing element 8 can also move relative to this opening, wherein this kind of design permits additional reflections of the sound in the sound-reducing element. The sound can subsequently leave the cavity 6 via the opening 9 in a strongly reduced and dampened form.

A second embodiment of the invention is explained in further detail in the following. To avoid repetitions, only the differences to the first embodiment are explained, wherein the same parts are given the same reference numbers.

In contrast to the first embodiment, the second embodiment is provided with an intermediate wall 20, formed integrally with the second profile section. The intermediate wall 20 is also provided with an opening 21 which is aligned with the openings 7 and 9 and has the same dimensions. An additional cavity 22 is created in the profile element as a result of the intermediate wall 20.

It has turned out that the additional intermediate wall 20 and the opening 21 permit further reflections of the sound within the additional cavity 22, which results in a further improvement of the sound insulation.

A third embodiment of the invention is explained in further detail in the following. To avoid unnecessary repetitions, we again explain only the differences to the first embodiment. Identical components are given the same reference numbers.

For the third embodiment, a membrane of plastic material, preferably polypropylene, is used as sound-reducing element 8 in place of a nonwoven material. The sound-reducing element 8 for the third embodiment is provided with projecting edges 23 on the side, which are fitted into recesses 24 on the second profile section 4. A form-locking connection is thus created between the sound-reducing element 8 and the second profile section 4. As a result of the design of the sound-reducing element 8 for the third embodiment, the sound-reducing element 8 is pre-stressed and forms a membrane. An additional cavity is created between the sound-reducing element 8 and the intermediate wall 20. The design of the third embodiment makes it possible to improve the acoustic vibration behavior of the sound-reducing element 8 while its position inside the cavity 6 is additionally defined precisely.

A fourth embodiment of the invention is described in the following, wherein we again explain only the differences to the preceding embodiments. Identical components are given the same reference numbers.

In the same way as the third embodiment, the fourth embodiment is provided with a sound-reducing element 8 in the form of a membrane. The sound-reducing element 8 of the fourth embodiment is also a plastic element and is attached to a profile insert 25 which forms a membrane support. The profile insert is provided with supporting sections 26 for supporting itself inside the one-piece profile element 1. The supporting sections 26 in this case are pre-tensioned slightly to ensure a secure hold of the profile insert in the profile element 1. The membrane can be produced by co-extruding it, for example together with the profile insert.

FIG. 5 shows a different, fifth embodiment of the invention. To avoid repetitions, we again explain only the differences to the first embodiment, wherein identical components are given the same reference numbers.

For the fifth embodiment, three profile elements 1 are connected via living hinges 14. The profile elements themselves are formed integrally. The rear wall has a concave shape and forms a support section 27 on which the sound-reducing element 8 rests. The support section 27 contains the opening 9. The spacing between the support section 27 and the rear wall 5 and the front wall 3 is dimensioned approximately in the same way as for the first embodiment. As a result, the mobility of the sound-reducing element 8 in axial direction of the openings 7 and 9 is ensured.

The three profile elements shown in FIG. 5 essentially have the same design, wherein the left profile element is provided with the fastening recess 15 and a fastening element 13 is attached flexibly to the right profile element. The roller blind can be formed in the known manner by connecting the fastening elements 13 and the fastening recesses 15 of adjacent profile elements.

The profile elements and roller blinds according to the invention noticeably improve the sound-reducing properties as compared to traditional profile elements and roller blinds. In addition, the assembly is also simplified.

The invention claimed is:

1. A profile element adapted to be flexibly connected to other adjacent profile elements for forming a roller blind, said profile element comprising:

a front wall and a rear wall, arranged at a distance from one other and defining at least one cavity, wherein between the front wall and the rear wall, an opening located in the front wall, the opening providing access to the cavity, and a sound-reducing element located in the cavity, wherein at least a portion of the sound-reducing element comprises a sound-absorbing material configured and dimensioned to be movable within the cavity toward the opening and away from the opening, at least in a region proximate the opening.

2. A profile element as defined in claim 1, wherein the sound-reducing element is substantially mat-shaped.

3. The profile element as defined in claim 1, wherein the sound-reducing element is inserted into the cavity or is pushed into the cavity.

4. The profile element as defined in claim 1, wherein the sound-absorbing material is a fiber material.

5. The profile element as defined in claim 1, wherein the sound-absorbing material is a nonwoven material.

6. The profile element as defined in claim 1, wherein the sound-absorbing material comprises a membrane.

7. The profile element as defined in claim 1, wherein the sound-absorbing material comprises a membrane made of plastic.

8. The profile element as defined in claim 1, wherein only one opening is provided in the front wall, as seen in the cross section.

9. The profile element as defined in claim 1, wherein in the cross-sectional view, the width of the opening is less than one third of the width of the front wall and more than one tenth of the width of the front wall.

10. The profile element as defined in claim 1, wherein several spaced-apart openings are provided in longitudinal direction of the profile element.

11. The profile element as defined in claim 10, wherein the openings are uniformly spaced apart.

12. The profile element as defined in claim 10, wherein a spacing between the openings is less than or equal to the dimension in longitudinal direction of the profile element.

13. The profile element as defined in claim 1, wherein the dimension of the opening in longitudinal direction of the profile element is less than or equal to twice the dimension of the opening as seen in a cross-sectional view of the profile element.

14. The profile element as defined in claim 1, further comprising an opening in the rear wall.

15. The profile element as defined in claim 14, wherein the openings in the front wall and the rear wall are embodied to be substantially the same.

16. The profile element as defined in claim 1, further comprising an intermediate wall between the front wall and the rear wall.

17. The profile element as defined in claim 16, wherein the intermediate wall is arranged such that at least one first cavity is formed between the front wall and the intermediate wall and at least one second cavity is formed between the intermediate wall and the rear wall.

18. The profile element as defined in claim 17, further comprising an opening in the rear wall that is aligned with the opening in the front wall.

19. The profile element as defined in claim 17, wherein the intermediate wall is provided with at least one opening which connects the two cavities.

20. The profile element as defined in claim 19, wherein the opening in the intermediate wall is aligned with the opening in the front wall or with the opening in the rear wall.

21. The profile element as defined in claim 1, wherein the sound-reducing element extends over the complete length of the profile element.

22. The profile element as defined in claim 1, further comprising fastening means for fastening the sound-reducing element within the cavity.

23. The profile element as defined in claim 22, wherein the fastening means are provided with recesses for accommodating projections and the sound-reducing element is provided with projecting edges for securing the sound reducing element to the recesses.

24. The profile element as defined in claim 1, wherein the profile element has at least two parts separated by an intermediate wall, with a first profile section that comprises the front wall and a second profile section which comprises the rear wall.

25. The profile element as defined in claim 24, wherein the intermediate wall is attached to the second profile section.

26. The profile element as defined in claim 24, further comprising fastening means attached to the second profile section.

27. The profile element as defined in claim 24, wherein the first profile section can be joined with a snap-on connection to the second profile section.

28. The profile element as defined in claim 24, wherein the first profile section can be snapped in the manner of a lid onto the second profile section.

29. The profile element as defined in claim 24, wherein the intermediate wall takes the form of a profile insert that is arranged between the front wall and the rear wall.

30. The profile element as defined in claim 29, wherein the profile insert comprises support sections by means of which the profile insert supports itself on the front wall and the rear wall.

31. The profile element as defined in claim 29, wherein the sound absorbing material comprises a membrane fixedly connected to the profile insert.

* * * * *